United States Patent Office 3,763,151
Patented Oct. 2, 1973

3,763,151
HETEROCYCLIC QUATERNARY AMMONIUM COMPOUNDS
John Kazan, Jr., Bridgewater Township, Somerset County, N.J., assignor to American Cyanamid Company, Stamford, Conn.
No Drawing. Filed Dec. 4, 1968, Ser. No. 781,277
Int. Cl. C09b 23/00
U.S. Cl. 260—240 G    1 Claim

ABSTRACT OF THE DISCLOSURE

Heterocyclic quaternary ammonium compounds of the formulas:

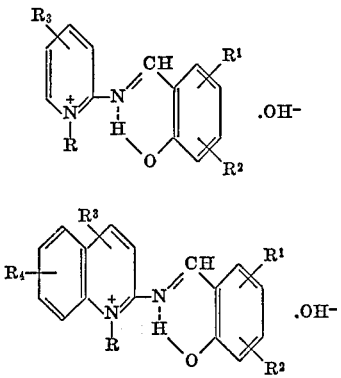

wherein R is alkyl ($C_1$–$C_{18}$), cycloalkyl or aralkyl; $R^1$ is an electronegative substituent; $R^2$ is hydrogen or $R^1$; and $R^3$ and $R^4$ are lower alkyl or halogen.

These compounds are prepared by reacting the corresponding salicylaldehydes with 1,2-dihydro-2-imino-1-alkylpyridines or -quinolines. The products in suitable media exhibit thermochromism, which is also dependent on the amount of moisture in the system, and are therefore useful as temperature indicators and water detectors.

---

This invention relates to a new class of heterocyclic quaternary amonium compounds. More particularly, it relates to pyridinium and quinolinium hydroxides of Formulas I and II, respectively:

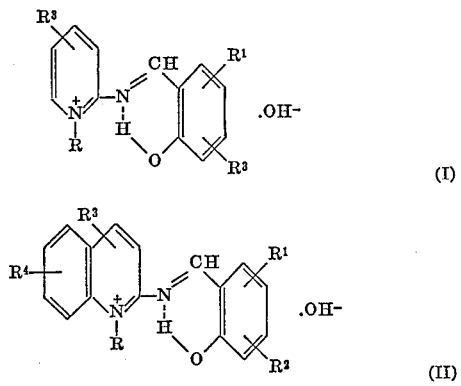

In the above formulas R is alkyl ($C_1$–$C_{18}$ but preferably lower alkyl) including straight or branched chains, cycloalkyl or aralkyl; $R^1$ is an electronegative substituent; $R^2$ is hydrogen or $R^1$; and $R^3$ and $R^4$ are lower alkyl or halogen. Suitable electronegative substituents include halo (bromo, chloro, iodo, fluoro), nitro, cyano, acetyl, and the like. In these formulas the broken line indicates that the compounds may exist as hydrogen bonded structures. Moreover, the positions of $R^1$ and $R^2$ on the rings are not significant and may be any combination of the four available positions. Obviously, $R^1$, $R^2$, $R^3$ and $R^4$ may be the same or different.

The heterocyclic quaternary ammonium compounds of Formulas I and II can be obtained by reacting the corresponding 1,2-dihydro-2-imino-1-alkylpyridine (III) or -quinoline (V) with a strongly negatively substituted salicylaldehyde (IV). This reaction is shown below in reaction (1) for the pyridinium compounds and in reaction (2) for the quinolinium compounds:

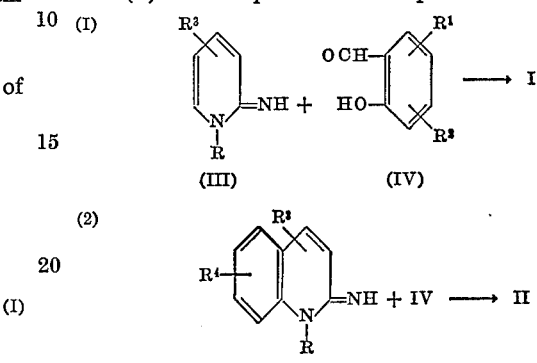

The 1,2-dihydro-2-imino-1-alkylpyridines (Formula III) and -quinolines (Formula V) of use for preparing the compounds of this invention are known compounds or can be prepared by known processes and include those wherein R is methyl, ethyl, propyl, butyl, pentyl, hexyl, heptyl, octyl, nonyl, decyl, undecyl, dodecyl, tridecyl, tetradecyl, hexadecyl, octadecyl, cyclopentyl, cyclohexyl, benzyl, phenethyl, phenylpropyl, naphthylmethyl, and the like. Thus, any aryl group in R may be mono- or bicyclic hydrocarbon and alkyl in aralkyl may contain 1 to 18 carbon atoms, preferably 1 to 4 carbon atoms.

The negatively substituted salicylaldehydes (Formula IV) are known compounds or can be prepared by known processes and include 3-, 4-, 5-, and 6-bromosalicylaldehydes,
3-, 4-, 5- and 6-chlorosalicylaldehydes,
3- and 5-iodosalicylaldehydes,
3- and 5-fluorosalicylaldehydes,
3-, 4- and 5-nitrosalicylaldehydes,
3-cyanosalicylaldehyde,
3,5-dibromosalicylaldehyde,
3,5-dichlorosalicylaldehyde,
3,5-diisodosalicylaldehyde,
5-bromo-3-chlorosalicylaldehyde,
5-chloro-3-fluorosalicylaldehyde,
3-bromo-5-nitrosalicylaldehyde,
5-chloro-3-nitrosalicylaldehyde,
3-fluoro-5-nitrosalicylaldehyde,
3,5-dinitrosalicylaldehyde,
3,5-diacetylsalicylaldehyde,
3-chloro-5-methylsalicylaldehyde,
5-chloro-3-methylsalicylaldehyde,
3-nitro-5-methylsalicylaldehyde,
5-bromo-3,6-dimethylsalicylaldehyde,
5-chloro-4,6-dimethylsalicylaldehyde, and the like.

Methods for preparing the imino compounds of Formulas III and V include the reaction of a 2-amino-1-alkylpyridinium or -quinolinium iodide with silver oxide according to the procedure of Ber. 54, 818 (1921). In an alternate procedure an alkali metal hydroxide is used in aqueous medium in place of the oxide.

The 2-amino-1-alkylpyridinium and -quinolinium iodides are known as a class and are easily prepared by reacting the corresponding 2-aminopyridine or -quinoline with an alkyl iodide according to well-known procedures. [J. Prakt. Chemie 56, 204 (1897); Ber. 54, 814 (1921)].

The 2-aminopyridines and 2-aminoquinolines are also known compounds. Some are available from commercial sources and others are easily prepared by published procedures, such as that of Chemical Abstracts, 47, 8747 (1953) wherein a corresponding 2-halo compound is the starting material. The specifically reported 1,2-dihydro-2-imino-1-alkylpyridines of Formula III are those where R is methyl, ethyl, propyl, and butyl [Ber. 54, 818 (1921)].

Known substituted 2-aminopyridines and 2-aminoquinolines of use in preparing the pyridinium and quinolinium iodides include 2-amino-3-, -4-, -5-, and -6-methylpyridine, 2-amino-3-, -4-, -5- and -6-ethylpyridine, 2-amino-6-propylpyridine, 2-amino-3- and -5-butylpyridines, 2-amino-8-methylquinoline, 2-amino-8-ethylquinoline and the like. Representative known 2-halopyridines and 2-haloquinolines from which 2-aminopyridines and 2-aminoquinolines may be prepared include 2-bromo-4-butylpyridine, 2-chloro-6-methylquinoline, 2-bromo-3,4-, -4,6-, -4,7- and -4,8-dimethylquinoline, 2-chloro-4,8-dimethylquinoline, and the like.

The reaction of a 1,2-dihydro-2-imino-1-alkylpyridine (Formula III) or a 1,2-dihydro-2-imino-1-alkylquinoline (Formula V) with the negatively substituted salicylaldehyde is preferably carried out in an inert solvent. Approximately equimolecular amounts of the reactants are used, although a slight excess of either reactant may be employed. Any inert solvent in which the reactants are soluble can be used. Suitable solvents include methanol, ethanol, benzene, and the like. An elevated temperature is employed, conveniently the reflux temperature of the solvent. The reaction is continued until essentially complete. The products are isolated by conventional procedures, such as by evaporation of the solvent. If desired, the product can be purified by crystallization from a suitable solvent.

The pyridine or quinoline starting material preferably is prepared in the solvent to be used for the main reaction. This procedure eliminates the necessity of isolating the starting material. The pyridinium or quinolinium iodide is treated in the solvent with 1.5–2.0 molar equivalents of silver oxide. The resulting mixture is filtered to remove the silver iodide and excess silver oxide. The filtrate, a solution of the imino starting material, is then ready for the main reaction.

In a less desirable alternate in situ procedure, the silver oxide is added to a heated (refluxing) solution of the pyridinium or quinolinium iodide and salicylaldehyde. The products obtained by this procedure contain more byproducts than those from the preferred procedure.

An aqueous alkali such as an alkali metal hydroxide may be used in place of silver oxide. For example, the pyridinium or quinolinium iodide may be treated with 5 N sodium hydroxide and the resulting imino compound separated by extraction with a water immiscible solvent, such as ether.

The compounds of this invention are yellow to orange solids and are soluble in water and a wide variety of organic solvents. The compounds are thermochromic, i.e., they exhibit a color change when heated in a nonrigid substrate, as in a non-aqueous solvent or liquid polymeric material. The color change is probably due to a shift in an equilibrium, possibly as shown below for the pyridinium compound wherein the R groups are as defined above:

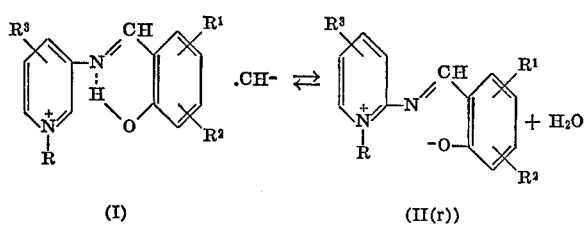

(I)　　　　　　　(II(r))

The color change when compositions containing the compounds are heated is from shorter wavelengths to longer wavelengths, i.e., toward the violet end of the visible spectrum. When the composition is cooled, the original color reappears. The color change also takes place in an anhydrous liquid medium. Apparently, absence of water in the medium causes a shift in the above equilibrium to the right side. The addition of a little water apparently then causes reversal of the equilibrium and the original color reappears.

By virtue of the above described properties, the compounds of Formulas I and II are useful for the detection of water in a nonaqueous solvent. For example, when a compound of this invention is added to a thoroughly dried solvent, such as methylene chloride or chlorobenzene, there is an immediate color change. If moisture is then introduced, the original color appears. If there is appreciable moisture in the solvent when the compound is added, there will be no color change. The amount of color change is an indication of the degree of dryness of the solvent. A specific system of this type is illustrated in Example 8 below.

The compounds are also useful as temperature indicators since the color changes are related to the temperature to which compositions containing the compounds are heated. Thus, color change versus temperature can be determined for nonrigid media containing compounds of Formulas I and II. Such calibrated systems are then useful for visually showing temperature changes in an environment, such as in a reaction zone.

The following examples will serve as further illustration of the invention without necessarily limiting it thereto. All parts and percentages are by weight unless otherwise indicated.

EXAMPLE 1

2-(2-hydroxy-5-nitrobenzylideneamino)-1-methylpyridinium hydroxide

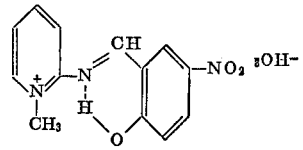

A mixture of 3.02 grams (0.0182 mole) 5-nitrosalicylaldehyde, 4.3 g. (0.0182 mole) 2-amino-1-methylpyridinium iodide, 2.5 grams (0.02 mole) silver oxide and 50 milliliters ethanol are heated at the reflux temperature for about 15 hours. The mixture is filtered and the filtrate is evaporated in vacuo to remove the ethanol. The residue is dissolved in a minimum amount of ethanol and sufficient ether is added to precipitate the product. After recrystallization from the mixture of acetonitrile and ethyl acetate, the product appears as yellow crystals, melting at about 155–157° C.

Calculated for $C_{13}H_{13}N_3O_4$ (percent): C, 56.7; H, 4.76; N, 15.3. Found (percent): C, 56.1; H, 4.77; N, 15.3.

When the above procedure is repeated substituting an equivalent amount of 3-nitro-5-methylsalicylaldehyde for the 5-nitrosalicylaldehyde, the product is 2-(2-hydroxy-3-nitro-5-methylbenzylidineamino)-1-methylpyridinium hydroxide.

EXAMPLE 2

2-(2-hydroxy-5-nitrobenzylidineamino)-1-methylquinolinium hydroxide

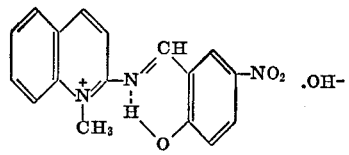

The procedure of Example 1 is followed in all essential details except for the substitution of 1.6 grams (0.096 mole) 5-nitrosalicylaldehyde, 2.6 grams (0.0091 mole) 2-amino-1-methylquinolinium iodide, 1.25 grams (0.01 mole) silver oxide and 50 milliliters ethanol. The yellow product, after recrystallization from acetonitrile, melts at about 169–170° C. with decomposition.

Calculated for $C_{17}H_{15}N_3O_4$ (percent): C, 62.8; H, 4.65; N, 12.9; O, 19.7. Found (percent): C, 62.3; H, 4.90; N, 13.1; O, 20.3.

EXAMPLE 3

2-(2-hydroxy-3,5-dibromobenzylidineamino)-1-methylpyridinium hydroxide

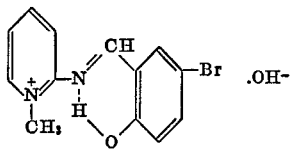

A solution of 1.24 grams (0.0053 mole) 2-amino-1-methylpyridinium iodide in 25 milliliters ethanol is prepared, and 1.25 grams (0.01 mole) silver oxide is added. The mixture is stirred for about 10 minutes and is then filtered. The filtrate is added to a solution of 1.4 grams (0.005 mole) 3,5-dibromosalicylaldehyde in 25 milliliters ethanol while the solution is being refluxed. The refluxing is continued for about 2 hours. After the solvent is evaporated, the residual oil is treated with ether and the resulting orange crystals, after recrystallization from acetonitrile, melt at about 161–162° C.

Calculated for $C_{13}H_{12}N_2O_2Br_2$ (percent): C, 40.2; H, 3.12; N, 7.22; O, 8.25; Br, 41.2. Found (percent): C, 40.1; H, 3.16; N, 7.25; O, 8.81; Br, 40.5.

EXAMPLE 4

2-(2-hydroxy-3,5-dibromobenzylidineamino)-1-methylquinolinium hydroxide

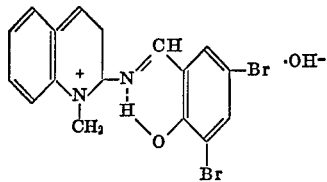

The procedure of Example 3 is followed in all essential details except for the use of 1.43 grams (0.005 mole) of 2-amino-1-methylquinolinium iodide in place of the pyridinium salt. The yellow product, after recrystallization from ethyl acetate, melts at about 176–177° C.

Calculated for $C_{17}H_{14}N_2O_2Br_2$ (percent): C, 46.6; H, 3.22; N, 6.40; O, 7.30; Br, 36.5. Found (percent): C, 46.2; H, 3.25; N, 6.27; O, 7.57; Br, 35.5.

EXAMPLE 5

2-(2-hydroxy-5-chloro-3-nitrobenzylidineamino)-1-methylquinolinium hydroxide

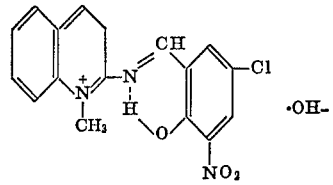

The procedure of Example 4 is followed in all essential details except for the substitution of 1.01 grams (0.005 mole) 5-chloro-3-nitrosalicylaldehyde for the 3,5-dibromosalicylaldehyde. The residue from the evaporation of the solvent, after recrystallization from acetonitrile, is an orange solid melting at about 215–216° C. with decomposition.

Calculated for $C_{17}H_{14}N_3O_4Cl$ (percent): C, 56.8; H, 3.93; N, 11.7; O, 18.3; Cl, 9.86. Found (percent): C, 56.2; H, 3.70; N, 11.7; O, 18.9; Cl, 9.86.

EXAMPLE 6

2-(3,5-dinitro-2-hydroxybenzylidineamino)-1-methylpyridinium hydroxide

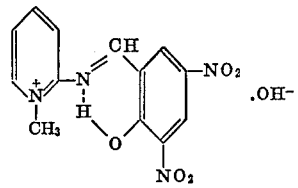

2-amino-1-methylpyridinium iodide (2.22 grams, 0.00944 mole) is treated with a minimum amount of 5 N aqueous sodium hydroxide. The mixture is extracted with ether and the ether is dried over anhydrous sodium sulfate. The ether is decanted and additional ether is added to give a total volume of 200 milliliters. A solution of 2.0 grams (0.00944 mole) 3,5-dinitrosalicylaldehyde in 200 milliliters ethanol is added, and the resulting solution is allowed to stand for about 15 hours at 20–25° C. By the addition of an equal amount of ether, orange crystals are obtained which, after recrystallization from ethanol and nitromethane, melt at about 183–185° C. with decomposition.

Calculated for $C_{13}H_{12}N_4O_6$ (percent): C, 48.8; H, 3.78; N, 17.5; O, 30.0. Found (percent): C, 48.3; H, 3.45; N, 17.5; O, 29.8.

EXAMPLE 7

2-(3,5-dinitro-2-hydroxybenzylidineamino)-1-methylquinolinium hydroxide

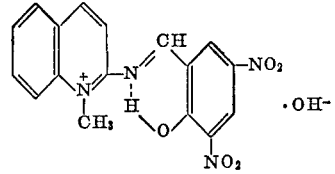

The procedure of Example 6 is followed in all essential details except for the substitution of 2.7 grams (0.00944 mole) 2-amino-1-methylquinolinium iodide for the pyridinium salt. After recrystallization from acetonitrile and ethyl acetate, the yellow crystalline product melts at about 224–225.5° C.

Calculated for $C_{17}H_{14}N_4O_6$ (percent): C, 55.1; H, 3.81; N, 15.1; O, 25.9. Found (percent): C, 55.0; H, 3.73; N, 15.2; O, 25.9.

EXAMPLE 8

The visible spectrum data listed in table below for the products of Examples 1–7 were obtained on a Cary 14 spectrophotometer using methylene chloride as the solvent and a 1-centimeter cell. The solutions were prepared by dissolving 2–5 milligrams of sample in 50 milliliters of solvent. The λ max. values are given in millimicrons and the absorption intensities at λ max. are listed under $\epsilon$ (the molar absorptivity), these values having the units liter/mole/cm.

The thermochromic color change of each product was determined by heating a solution of the product in chlorobenzene to the boiling point of the solution (about 132° C.). The color changes are reversible, that is, the solutions revert to the initial color when cooled.

TABLE

| Product of Example— | Visible spectrum stable form | | Thermochromic color change in chlorobenzene | |
|---|---|---|---|---|
| | $\lambda_{max}$ | $\epsilon$ | 25° C. | 132° C. |
| 1 | 520 | 200 | Orange | Magenta. |
| 2 | 422 | 1,600 | Yellow | Purple. |
| 3 | 552 | 1,160 | Red | Do. |
| 4 | 356 | 11,960 | Yellow | Blue. |
| 5 | 462 | 5,140 | Orange | Green.[1] |
| 6 | 409 | 4,586 | do | Red. |
| 7 | 406 | | do | Do. |

[1] When the solution was boiled for about 30 minutes in order to remove all of the water, the solution became Prussian blue in color. When atmospheric moisture was admitted, the solution again became green.

EXAMPLE 9

When the products of Examples 1-7 are added to anhydrous solvents, such as chlorobenzene, which have been made completely anhydrous by boiling until all of the water has been removed by azeotropic distillation, the solution assumes the color of the unstable form of the product, as shown in the table under "132° C.".

I claim:

1. A process for preparing heterocyclic quaternary ammonium compounds of the formulas:

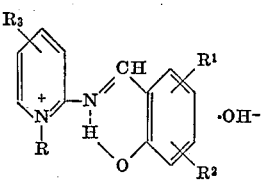
(I)

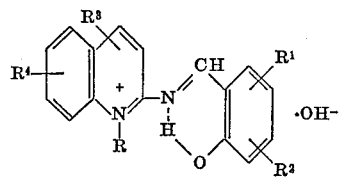
(II)

which comprises reactively contacting at an elevated temperature and dissolved in an inert solvent approximately equimolar amounts of a salicylaldehyde having the formula:

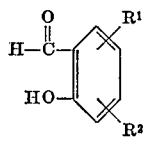

with a pyridine having the formula:

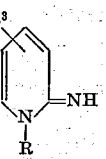

or a quinoline having the formula:

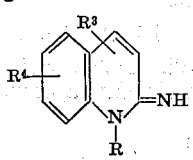

wherein R is alkyl of 1 to 4 carbon atoms, $R^1$ is bromo, chloro, iodo, fluoro, nitro, cyano or acetyl, $R^2$ is hydrogen, methyl, bromo, chloro, iodo, fluoro, nitro or acetyl and $R^3$ and $R^4$ are hydrogen or an alkyl of 1 to 4 carbon atoms.

References Cited

UNITED STATES PATENTS

| | | | |
|---|---|---|---|
| 2,472,292 | 6/1949 | Friedman et al. | 260—240 |
| 3,288,799 | 11/1966 | Sletzinger et al. | 260—240 |

OTHER REFERENCES

MacDermott, "Aust. J. Chem.," Vol. 19 (1966), pp. 2389-92.

Garnovskii et al., "Index Chemicus," Vol. 27 (1967), col. 87789.

Sheinkman et al., "Chemical Abstracts," Vol. 69 (1968), col. 59061y.

Osipov et al., "Chemical Abstracts," Vol. 68 (1968), col. 87107r.

ALEX MAZEL, Primary Examiner

J. H. TURNIPSEED, Assistant Examiner

U.S. Cl. X.R.

260—286 Q, 296 R

UNITED STATES PATENT OFFICE
CERTIFICATE OF CORRECTION

Patent No. 3,763,151            Dated October 2, 1973

Inventor(s) JOHN KAZAN, JR.

It is certified that error appears in the above-identified patent and that said Letters Patent are hereby corrected as shown below:

Col. 3, line 69, in the formula: ".CH-" should read -- .OH- --.

Col. 3, line 75: "(II(r))" should read -- I(a) --.

Col. 5, line 18, in the formula: " 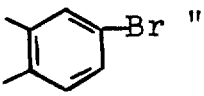 "

should read -- 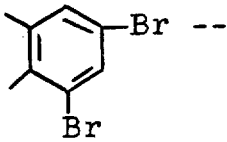 --

Col. 5, lines 40-43, in the formula: " 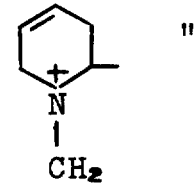 " should read:
-- 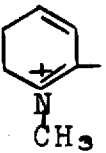 --

Col. 5, line 57: (in the formula) " 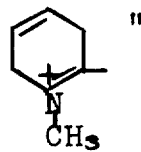 " should read
-- 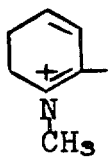 --

Signed and sealed this 5th day of March 1974.

(SEAL)
Attest:

EDWARD M. FLETCHER, JR.      C. MARSHALL DANN
Attesting Officer            Commissioner of Patents